Nov 24, 1953 E. TOURATON ET AL 2,660,689

ULTRAHIGH-FREQUENCY VACUUM TUBE

Filed June 17, 1948

*Inventor*
E. TOURATON – R. ZWOBODA
By Philip M. Bolton
*Attorney*

Patented Nov. 24, 1953

2,660,689

UNITED STATES PATENT OFFICE 2,660,689

ULTRAHIGH-FREQUENCY VACUUM TUBE

Emile Touraton and René Zwobada, Paris, France, assignors to International Standard Electric Corporation, New York, N. Y., a corporation of Delaware Application June 17, 1948, Serial No. 33,614

Claims priority, application France August 1, 1947

5 Claims. (Cl. 315—3)

The present invention relates to ultrahigh frequency vacuum tubes and in particular to such tubes used as very wide-band frequency amplifiers.

The invention relates to such tubes in which an interaction takes place between an electron beam and a guided wave travelling on a wave guide such as an helix, for example.

When the total time taken for the wave to travel inside such a tube is high compared with the period of the high frequency wave which modulates the beam, the amplified wave is distorted and the quality of the amplifier is impaired. This distortion may be due to the return wave induced by the density modulated beam, to multiple reflection on the irregularities of the helix and in particular to irregularities in the pitch and reflections on the dielectric supporting members. This return wave may also be due to a poor impedance matching of the output wave guide.

These waves add up to make a resulting wave, which modulates the beam simultaneously with the applied high frequency wave which it is desired to amplify.

At all points of the tube and in particular at the input the resulting return wave has a modulation which is different from the direct wave, this difference is due to the changes in the modulation signal during the direct and return travel of the wave inside the tube. This resulting return wave modulates the beam at the same time as the direct wave and thus causes a distortion.

In order to reduce this distortion the wave travelling inside the tube is usually attenuated, this attenuation is, however, limited since it tends to reduce the gain of the tube.

One object of the present invention is a velocity modulation electronic amplifier with a low distortion factor for very high modulating frequencies.

According to features of the invention the transfer of energy between the electron beam and the high frequency wave to be amplified is made in a number of non-selective circuits through whcih flows the electron beam. These non-selective circuits are sufficiently short so that the time necessary for the wave to travel through such a circuit only contains a limited number of periods of the high frequency which modulates the electron beam. The duration of this travel is all the shorter as the desired distortion factor is lower and the modulating frequency higher.

The above mentioned and other features and objects of this invention will become more apparent and the invention itself, though not necessarily defined by said features and objects, will be best understood by reference to the following description of an embodiment of the invention taken in connection with the accompanying drawings wherein.

Figure 1:
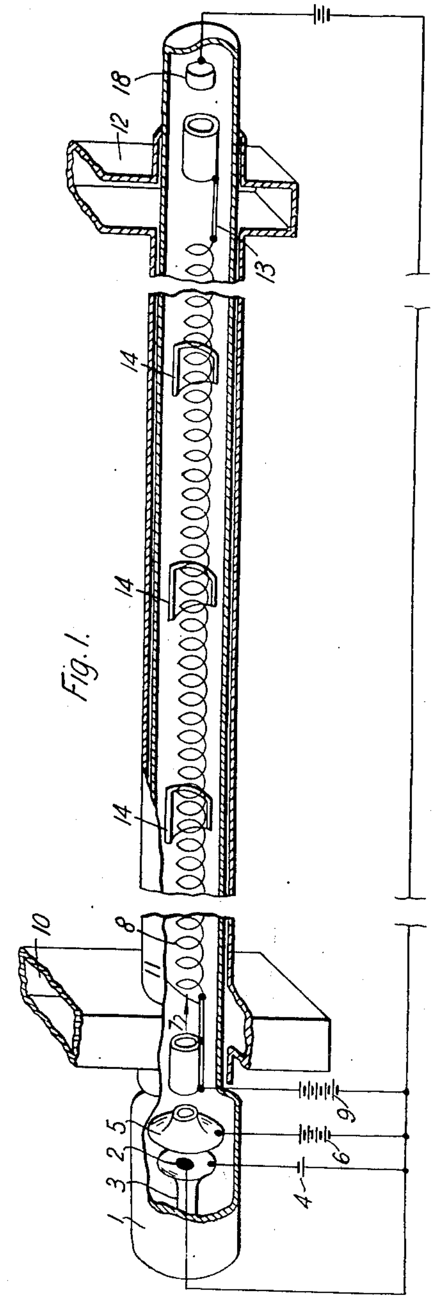
Fig. 1 shows schematically an embodiment incorporating features of the invention.

Referring now to Fig. 1, the electronic structure is enclosed in an evacuated envelope 1. The electron beam is generated by an electron gun comprising, for example, an emissive cathode 2 which may be of the heater type and whose potential will be taken as a reference potential for the rest of the description, a concentrating electrode 3 which may be brought to a low positive or slightly negative potential with respect to the cathode by a source of potential 4, an accelerating electrode 5 brought to a high potential by means of a source of potential 6. This electron gun generates a concentrated beam 7 which may be adjusted by varying the potential applied to the electrodes.

The electron beam flows afterwards through a circuit in which the transfer of energy from this beam and the applied high frequency wave takes place. This circuit in the embodiment shown is constituted by a conductor 8 helicoidally wound, having the same axis as the electron beam. This helix is brought to a high positive potential by means of a source of potential 9, for instance.

The helix is excited by means of a wave guide 10, for example, which is shown partly in sectional view with an appropriate antenna 11, coupling the helix with an external high frequency source (not shown on the drawing). At the other end of the helix is provided a wave guide 12 in which the amplified energy may be collected by an antenna 13 coupled to the helix. The impedances of the two waves guides 10 and 12 are adapted to the helix in order to provide a wide frequency band.

Figure 2:
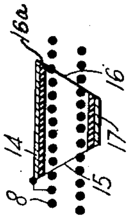
Fig. 2 shows a sectional view of an attenuating device used in the embodiment of Fig. 1 and Figs. 3 and 4 show variants of the embodiment shown in Fig. 2.

The helix along which travels the high frequency wave is split up into sections by separated means of attenuating devices 14. These devices, three in the embodiment shown, are constituted, for instance, by a tubing with a wedge cut at both ends 15 and 16 as shown in Fig. 2. The inside part of this tube is coated with a substance 16*a* which damps the high frequencies.

This device is placed outside the helix and inside the glass envelope 1.

Each of these damping devices is dimensioned in such a way as to match the impedance of the helix sections with their characteristic impedance at both ends and to provide a sufficiently high attenuation. Each of these devices is sufficiently short compared with the modulating wave length so that the transit time of the wave be short and the distortion due to the modulation of the beam by the return wave negligible.

Along the first section flows a wave applied by the input wave guide 10 modulating the electron beam. This wave slightly modulates the velocity of the electron, and is absorbed in the first damping device. The bunching of the electrons continues inside the damping device which acts as a drift electrode. In the following section the electrons generate two waves, one which flows in the same direction as the beam and the other which flows in the opposite direction as explained above. The induced currents flowing in the same direction of propagation as the electron beam add themselves in phase and the progressively amplified wave which results therefrom remodulates the beam. This new modulation of the beam does not differ from the initial modulation which it reinforces without distortion.

The return wave is caused by waves induced or reflected at any point of each section of the tube during a length of time shorter than twice the time of travel of the wave in each of the said sections. These waves do not add themselves in phase and the resulting wave remains of low amplitude. Their modulation at the specific moment differs only slightly from that of the direct wave which gave rise to them if the modulating signal has varied only slightly during the time which separates these two direct waves, i. e. if the total transit time through each section is small compared with the period of the modulating signal. This condition determines the length of each section for a given travelling speed of the wave.

The bunching of the electrons also takes place inside the damping devices and this also takes place in the following sections. The wave which travels inside the helix is thus progressively amplified and the energy collected at the end of the last section by means of the wave guide to be applied to the load (not shown). It is clear that this arrangement is given only by of example and that other means may be used for collecting the high frequency energy. The damping devices 14 may also be brought to potentials different from that of the helix. The electron beam reaches the collecting electrode 18 at an appropriate potential.

Figure 3:
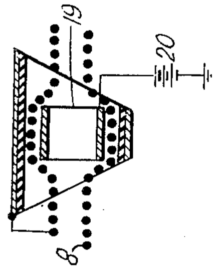

Fig. 3 shows a variant of the embodiment shown in Fig. 1 in which a drift electrode 19 is provided inside the damping devices and brought to a low potential with respect to the helix potential by a source of potential 20. The turns of the helix are increased in diameter at this point so as to surround the said drift electrodes.

With this arrangement the bunching of the electrons takes place mainly in these drifting spaces. The intermediate circuits have as their main objects to remodulate the velocity of the electron beam by the wave which flows through in these circuits. This wave is induced by the bunches of electrons which have been grouped in the drift space preceding the said section.

The electron tubes which are shown on the drawing comprise an helicoidally wound conductor. It is clear that the helixes can be cut at the level of devices 14 and the successive helix sections brought to potentials of increasing values in order to accelerate those electrons, whose speed has fallen as and when they have transferred their energy to the wave which travels along the helixes.

Figure 4:
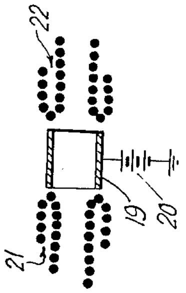

Fig. 4 shows another embodiment. In this case the helix is cut and doubled over its end in 21 and 22. This folded over section provides sufficient damping for each helix section. The successive helix sections may be brought to potentials of increasing value. The number of turns and their shape may be chosen so as to provide an impedance matching at the end of the helix sections.

While we have described a particular embodiment of our invention for purposes of illustration it should be understood that various modifications and adaptations thereof may be made within the spirit of the invention as set forth in the appended claims.

What we claim is:

1. In a travelling wave amplifier tube having a given longitudinal axis, an electron emitter for emitting a beam of electrons coaxially of said axis and a collector spaced from said emitter for collecting the electrons of said beam; a wave transmission conductor in the form of a helix disposed coaxially of said axis intermediate said emitter and said collector and a plurality of separate damping means for sectionalizing said conductor positioned at spaced points intermediate the ends of said conductor, the resulting sections of said conductor being coupled electrically by the flow of said electron beam along said axis, the means for sectionalizing said conductor including an annular electrode coaxially disposed with respect to said axis through which said beam is adapted to pass.

2. In a travelling wave amplifier tube according to claim 1, wherein said annular electrode surrounds said helix.

3. In a travelling wave amplifier tube according to claim 1, wherein the helix is enlarged in diameter in the vicinity of said electrode so as to surround said electrode.

4. In a travelling wave amplifier tube according to claim 1, wherein said annular electrode has at least one edge thereof inclined at an angle to said axis.

5. In a travelling wave amplifier tube according to claim 1, wherein means are provided to maintain the annular electrodes disposed between sections of said conductor at a positive potential.

EMILE TOURATON.
RENÉ ZWOBADA.

References Cited in the file of this patent

UNITED STATES PATENTS

| Number | Name | Date |
|---|---|---|
| 2,064,469 | Haeff | Dec. 15, 1936 |
| 2,300,052 | Lindenblad | Oct. 27, 1942 |
| 2,367,295 | Llewellyn | Jan. 16, 1945 |
| 2,395,560 | Llewellyn | Feb. 26, 1946 |
| 2,409,992 | Strobel | Oct. 22, 1946 |
| 2,516,944 | Barnett | Aug. 1, 1950 |
| 2,541,843 | Tiley | Feb. 13, 1951 |
| 2,575,383 | Field | Nov. 20, 1951 |
| 2,578,434 | Lindenblad | Dec. 11, 1951 |